(12) United States Patent
Zhao

(10) Patent No.: US 12,324,078 B2
(45) Date of Patent: Jun. 3, 2025

(54) MULTI-OUTPUT DIMMING POWER SUPPLY WITH SWITCHABLE OUTPUT MODES AND ITS USE METHOD

(71) Applicant: Zhuhai Shengchang Electronics Co., Ltd., Zhuhai (CN)

(72) Inventor: Xianyun Zhao, Chongqing (CN)

(73) Assignee: Zhuhai Shengchang Electronics Co., Ltd., Zhuhai (CN)

( * ) Notice: Subject to any disclaimer, the term of this patent is extended or adjusted under 35 U.S.C. 154(b) by 36 days.

(21) Appl. No.: 18/487,211

(22) Filed: Oct. 16, 2023

(65) Prior Publication Data
US 2024/0172352 A1 May 23, 2024

(30) Foreign Application Priority Data
Nov. 21, 2022 (CN) .......................... 202211461214.X

(51) Int. Cl.
*H05B 47/10* (2020.01)
*H02M 1/44* (2007.01)
*H05B 47/25* (2020.01)

(52) U.S. Cl.
CPC .............. *H05B 47/25* (2020.01); *H02M 1/44* (2013.01); *H05B 47/10* (2020.01)

(58) Field of Classification Search
CPC ........ H05B 45/20; H05B 45/24; H05B 45/46; H05B 45/48; H05B 45/315; H05B 45/325; H05B 45/355; H05B 45/375; H05B 45/3725; H05B 47/10; H05B 47/25; H02M 1/44
See application file for complete search history.

(56) References Cited

U.S. PATENT DOCUMENTS

| | | | |
|---|---|---|---|
| 10,616,968 B2 * | 4/2020 | Wang | H05B 45/31 |
| 2012/0188794 A1 * | 7/2012 | Chang | H05B 45/3575 363/16 |
| 2014/0176008 A1 * | 6/2014 | Harish Gopala Pillai | H05B 45/355 315/291 |
| 2016/0044759 A1 * | 2/2016 | Lai | H05B 45/48 315/186 |
| 2016/0330808 A1 * | 11/2016 | Brandt | H05B 45/375 |
| 2020/0037408 A1 * | 1/2020 | DeJonge | H05B 45/382 |

* cited by examiner

*Primary Examiner* — Tung X Le
(74) *Attorney, Agent, or Firm* — Birchwood IP

(57) ABSTRACT

The present invention provides a multi-output dimming power supply with switchable output modes and its use method, comprising: a dimming signal processing circuit, at least two PWM regulation modules, an electromagnetic filter circuit, a switching power supply main control circuit, a transformer, a rectifier filter circuit, a feedback regulation loop, a single-chip microcomputer control circuit, and a mode-switching circuit connected in sequence; wherein the feedback regulation loop is further connected to the main control circuit, and a signal input of each PWM regulation module is connected to each control terminal of the single-chip microcomputer control circuit. A positive pole of each PWM regulation module is connected to an output of the rectifier filter circuit and a load, respectively, and a negative pole is connected to the load. The present invention is capable of selecting different output modes for different applications, facilitating the achievement of superior dimming effects.

7 Claims, 2 Drawing Sheets

MULTI-OUTPUT DIMMING POWER SUPPLY WITH SWITCHABLE OUTPUT MODES AND ITS USE METHOD

FIELD OF INVENTION

The present invention relates to the technical field of dimming power supplies, and in particular, relates to a multi-output dimming power supply with switchable output modes and its use method.

BACKGROUND OF THE INVENTION

Dimming power supplies offer a variety of output configurations, including PWM output regulation mode, voltage regulation mode, and a hybrid mode that combines PWM and voltage regulation. In addition, these power supplies offer varying numbers of output channels, including single-channel and multi-channel options, wherein the multi-channel may output the multi-channel to comply with U.S. CLASS2 regulations or output the multi-channel to regulate a color temperature and a color. Output voltage regulation mode and PWM regulation mode have their own advantages and disadvantages. The output voltage regulation mode offers the qualities of smooth dimming without noticeable noise or flicker. However, it encounters challenges in synchronizing different color temperatures and colors with different lights. In contrast, output PWM regulation mode can accommodate lights with different color temperatures and colors, with low-frequency PWM dimming providing relative smoothness but suffering from flicker and noise issues that high-frequency PWM aims to mitigate. However, the higher PWM frequencies often compromise dimming smoothness and make it difficult to achieve low luminance levels. The hybrid mode of voltage and PWM regulation is effective in reducing flicker and noise while enhancing dimming smoothness, even at lower luminance levels. However, it still faces synchronization challenges when connecting lights with different color temperatures and colors.

Given the variety of modes described above, lamp and luminaire manufacturers are forced to develop a wide range of dimming power supplies. As a result, the process of selecting an appropriate dimming power supply becomes quite complicated for end users. Therefore, there is a need for an integrated solution that combines multiple dimming modes to effectively address a wide range of application scenarios. Such a solution would provide customers with the flexibility to freely select the desired output dimming mode for their specific requirements.

SUMMARY OF THE INVENTION

In order to overcome the deficiencies of the prior art, the purpose of the present invention is to provide a multi-output dimming power supply with switchable output modes and its use method.

In order to achieve the above purpose, the present invention provides the following solutions:

A multi-output dimming power supply with switchable output modes, comprising: a dimming signal processing circuit, at least two PWM regulation modules, an electromagnetic filter circuit, a switching power supply main control circuit, a transformer, a rectifier filter circuit, a feedback regulation loop, a single-chip microcomputer control circuit, and a mode-switching circuit connected in sequence.

The feedback regulation loop is further connected to the switching power supply main control circuit, and a signal input of each PWM regulation module is connected to each control terminal of the single-chip microcomputer control circuit. A positive pole of each PWM regulation module is connected to the output of the rectifier filter circuit and a load, respectively, and a negative pole of each PWM regulation module is connected to the load.

Preferably, the PWM regulation module comprises: a PWM drive and overcurrent protection circuit, a MOSFET, a connection channel, and a resistor.

A signal input of the PWM drive and overcurrent protection circuit is connected to the control terminal of the single-chip microcomputer control circuit, and a first output of the PWM drive and overcurrent protection circuit is connected to a gate of the MOSFET. A negative pole of the connection channel is connected to a drain of the MOSFET and the load, and a source of the MOSFET is connected to a second output of the PWM drive and overcurrent protection circuit and the resistor, which is further connected to the ground; and a positive pole of the connection channel is connected to the rectifier filter circuit, the feedback regulation loop, and the load, respectively.

A method of using the multi-output dimming power supply with switchable output modes as described above, comprising:

Using the single-chip microcomputer control circuit to detect the switching signal of the described mode-switching circuit to determine the output mode;

Using the dimming signal processing circuit to adjust and process the detected dimming signal, and inputting the processed dimming signal to the single-chip microcomputer control circuit as described;

Determining a dimming command signal according to the output mode and the processed dimming signal based on the single-chip microcomputer control circuit described therein, and outputting the dimming command signal to the feedback regulation loop and the PWM regulation module, respectively;

Comparing and processing the dimming command signal with a sampled power supply output voltage signal to obtain a control signal based on the feedback regulation loop described therein, and using the control signal to control the output of the transformer regulated by the switching power supply main control circuit so as to regulate the output voltage of the rectifier filter circuit; and Changing a duty ratio of the output voltage according to the dimming command signal based on the PWM regulation module described therein.

Preferably, the method of detecting the switching signal of the mode-switching circuit by using the single-chip microcomputer control circuit for determining the output mode comprises:

Detecting the state of the mode set by the mode-switching circuit at each time of power-up in the single-chip microcomputer control circuit; and Performing the switching of the output mode according to the mode state; wherein the output mode comprises a power supply output voltage regulation mode, a power supply output PWM regulation mode, a hybrid mode of power supply output voltage regulation and PWM regulation, and a power supply output color temperature or color regulation mode.

Preferably, when the single-chip microcomputer control circuit is switched to the power supply output voltage regulation mode according to the signal provided by the mode-switching circuit, using the single-chip microcomputer control circuit to send 100% of a dimming command signal to the PWM regulation modules and correspondingly control 100% conduction of each of the PWM regulation modules;

Sending the corresponding dimming command signal to the feedback regulation loop according to the dimming signal processed by the dimming signal processing circuit based on the single-chip microcomputer control circuit described therein; and Using the feedback regulation loop to compare and process the dimming command signal with a power supply output voltage signal sampled by the feedback regulation loop, and to output a signal for controlling the output of the transformer T1 regulated by the switching power supply main control circuit so as to regulate the output voltage of the rectifier filter circuit.

Preferably, when the single-chip microcomputer control circuit is switched to the power supply output PWM regulation mode according to the signal provided by the mode-switching circuit, using the single-chip microcomputer control circuit to send 100% of a dimming command signal to the feedback regulation loop;

Using the feedback regulation loop to control the switching power supply main control circuit to enable the transformer and the rectifier filter circuit to output 100% of a rated voltage;

Using the single-chip microcomputer control circuit to send the same dimming command signal to each of the PWM regulation modules according to the dimming signal processed by the dimming signal processing circuit; and Using the PWM regulation module to amplify the dimming command signal, and to regulate the output duty ratio of the output voltage according to the corresponding dimming command signal.

Preferably, when the single-chip microcomputer control circuit is switched to the hybrid mode of voltage regulation and PWM regulation of the power supply output according to the signal provided by the mode-switching circuit, using the single-chip microcomputer control circuit to send a dimming command signal to the feedback regulation loop in a time period within the entire dimming range and to send the dimming command signal to the respective PWM regulation module in another time period in order to achieve a time-phased regulation of the output voltage and output duty ratio.

Preferably, when the single-chip microcomputer control circuit is switched to the power supply output of the color temperature or color regulation mode according to the signal provided by the mode-switching circuit, using the single-chip microcomputer control circuit to send 100% of a dimming command signal to the feedback regulation loop;

Using the feedback regulation loop to control the switching power supply main control circuit to enable the transformer and the rectifier filter circuit to output 100% of the rated voltage;

Sending the PWM dimming command signals with different duty ratios to each of the PWM regulation modules, respectively, according to the dimming signals processed by the dimming signal processing circuit based on the single-chip microcomputer control circuit described therein; and Using the PWM regulation module to amplify the dimming command signal and regulate the output duty ratio of the output voltage according to the amplified dimming command signal, respectively, to regulate the color temperature, color, and luminance of the lights with different color temperatures or different colors that are correspondingly connected to each output voltage.

Preferably, it further comprises:

Detecting a voltage drop generated by the resistor in each PWM regulation module to achieve current limiting; and Using the PWM drive and overcurrent protection circuit in the PWM regulation module to shut down the corresponding connected MOSFET when an overcurrent occurs to achieve current limiting and short-circuit protection.

According to specific embodiments of the present invention, the following technical effects are disclosed by the present invention:

In a first aspect, the multi-output dimming power supply with switchable output modes provided by the present invention, comprising: a dimming signal processing circuit, at least two PWM regulation modules, an electromagnetic filter circuit, a switching power supply main control circuit, a transformer, a rectifier filter circuit, a feedback regulation loop, a single-chip microcomputer control circuit, and a mode-switching circuit connected in sequence; wherein the feedback regulation loop is further connected to the main control circuit, and the signal input of each PWM regulation module is connected to each control terminal of the single-chip microcomputer control circuit. The positive pole of each PWM regulation module is connected to the output of the rectifier filter circuit and the load, respectively, and the negative pole is connected to the load. In a second aspect, the method of using the multi-output dimming power supply with switchable output modes provided by the present invention, comprising: using the single-chip microcomputer control circuit to detect the switching signal of the described mode-switching circuit to determine the output mode; using the dimming signal processing circuit to adjust and process the detected dimming signal, and inputting the processed dimming signal to the single-chip microcomputer control circuit as described; determining the dimming command signal according to the output mode and the processed dimming signal based on the single-chip microcomputer control circuit described therein, and outputting the dimming command signal to the feedback regulation loop and the PWM regulation module, respectively; comparing and processing the dimming command signal with the sampled power supply output voltage signal to obtain the control signal based on the feedback regulation loop described therein, and using the control signal to control the output of the transformer regulated by the switching power supply main control circuit so as to regulate the output voltage of the rectifier filter circuit; and changing the duty ratio of the output voltage according to the dimming command signal based on the PWM regulation module described therein. The present invention enables switching between multiple output regulation modes, including voltage regulation, PWM regulation, and hybrid regulation, and switching with multiple output types. The adaptability of selecting different output modes for different applications facilitates the achievement of superior dimming effects.

BRIEF DESCRIPTION OF THE DRAWINGS

For a clearer description of the technical solutions in the embodiments of the present invention or the prior art, the accompanying drawings to be used in the embodiments are briefly described below, and it is obvious that the accompanying drawings in the following description are only some of the embodiments of the present invention, and that for a person of ordinary skill in the art, other accompanying drawings can be obtained based on these embodiments without giving creative work.

DETAILED DESCRIPTION OF THE PREFERRED EMBODIMENTS

The technical solutions in the embodiments of the present invention will be clearly and completely described below in conjunction with the accompanying drawings, obviously, the described embodiments are only a part of the embodiments of the present invention and not all embodiments. Based on the embodiments included in the present invention, all other embodiments that can be obtained by a person of ordinary skill in the art without creative work are within the scope of protection of the present invention.

Reference herein to "embodiments" means that particular features, structures, or characteristics described in connection with embodiments may be included in at least one embodiment of the present application. The presence of the phrase at various points in the specification does not necessarily refer to the same embodiment, nor is it a separate or alternative embodiment that is mutually exclusive of other embodiments. It will be understood by those skilled in the art, both explicitly and implicitly, that the embodiments described herein may be combined with other embodiments.

The terms "first", "second", "third", and "fourth" in the specification and claims of the present application and the accompanying drawings described herein are used to distinguish between different objects and are not intended to describe a particular order. In addition, the terms "comprising" and "having", and any variations thereof, are intended to cover non-exclusive inclusions. For example, the inclusion of a series of steps, processes, methods, etc., is not limited to the listed steps, but may optionally also include steps that are not listed, or may optionally include other steps that are inherent in those processes, methods, products, or equipment.

The purpose of the present invention is to provide a multi-output dimming power supply with switchable output modes and its use method that enables switching between multiple output regulation modes, including voltage regulation, PWM regulation, and hybrid regulation, and switching with multiple output types. The adaptability of selecting different output modes for different applications facilitates the achievement of superior dimming effects.

In order to facilitate the above purposes, features, and advantages of the present invention more obvious and easier to understand, the present invention will be further described below in combination with the accompanying drawings and specific embodiments.

Figure 1:
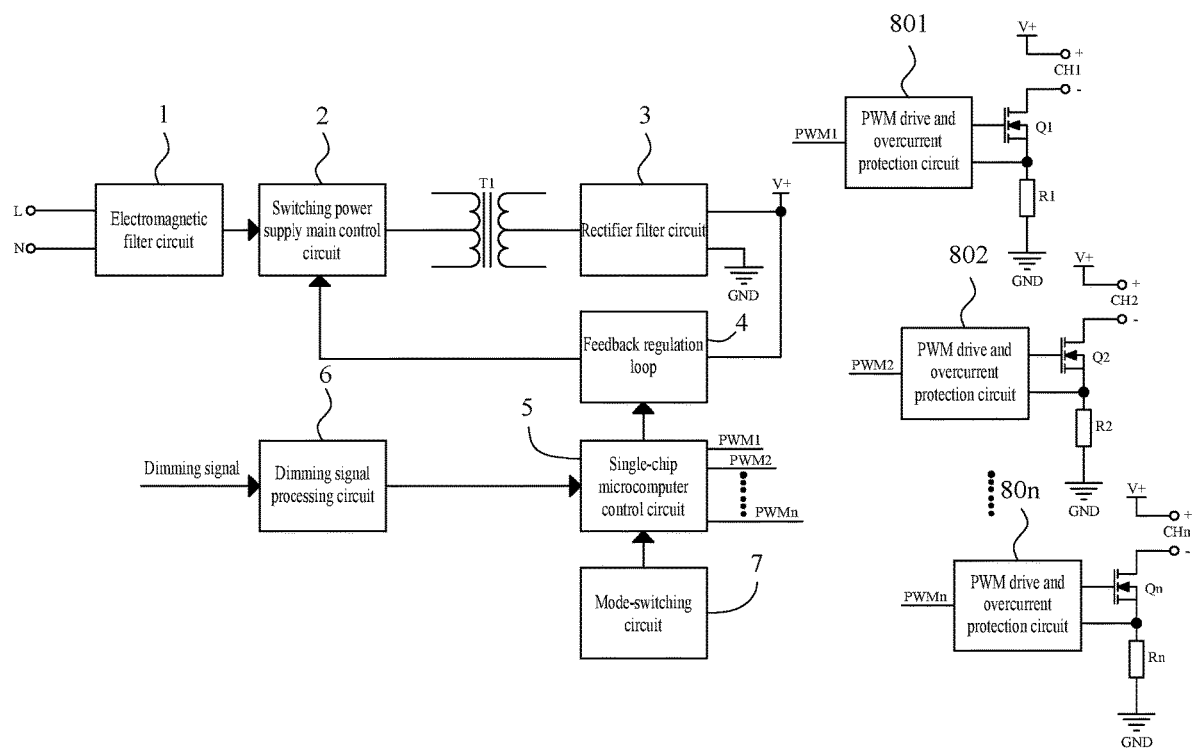
FIG. 1 is a schematic diagram of a circuitry principle structure provided by an embodiment of the present invention.

FIG. 1 is a schematic diagram of a circuitry principle structure provided by an embodiment of the present invention. As shown in FIG. 1, the present invention provides the multi-output dimming power supply with switchable output modes comprising: a dimming signal processing circuit 6, at least two PWM regulation modules, an electromagnetic filter circuit 1, a switching power supply main control circuit 2, a transformer T1, a rectifier filter circuit 3, a feedback regulation loop 4, a single-chip microcomputer control circuit 5, and a mode-switching circuit 7 connected in sequence;

Wherein, the feedback regulation loop 4 is further connected to the main control circuit 2, and a signal input of each PWM regulation module is connected to each control terminal of the single-chip microcomputer control circuit 5. A positive pole of each PWM regulation module is connected to the output of the rectifier filter circuit 3 and a load, respectively, and a negative pole of each PWM regulation module is connected to the load.

Preferably, each of the PWM regulation modules described comprises a PWM drive and overcurrent protection circuit, a MOSFET, a connection channel, and a resistor (in FIG. 1, the PWM drive and overcurrent protection circuits are denoted by 801, 802, and 80n, the MOSFETs are denoted by Q1, Q2, and Qn, the resistors are denoted by R1, R2, and Rn, and the connection channels are denoted by CH1, CH2, and CHn).

A signal input of the PWM drive and overcurrent protection circuit is connected to the control terminal of the single-chip microcomputer control circuit 5, and a first output of the PWM drive and overcurrent protection circuit is connected to a gate of the MOSFET. A negative pole of the connection channel is connected to a drain of the MOSFET and the load, and a source of the MOSFET is connected to a second output of the PWM drive and overcurrent protection circuit and the resistor, which is further connected to the ground; and a positive pole of the connection channel is connected to the rectifier filter circuit 3, the feedback regulation loop 4, and the load, respectively.

The utility power is input to the electromagnetic filter circuit 1 to filter out the electromagnetic interference, then input to the switching power supply main control circuit 2, which performs a power conversion with the transformer T1, and then rectified by the rectifier filter circuit 3 to obtain a stable DC voltage to provide a power to the load and provide the power supply to each circuit; and the single-chip microcomputer control circuit 5 detects a signal provided by the mode-switching circuit 7 to determine which output mode to execute. A dimming signal is input to the dimming signal processing circuit 6, and the dimming signal may be a dimming signal of various types of dimming methods, wherein a certain type of dimming signal corresponds to a certain type of dimming signal processing circuit 6, and the present invention does not impose any limitation on the type of dimming. The dimming signal processing circuit 6 adjusts and processes the dimming signal and inputs it to the single-chip microcomputer control circuit 5, which outputs a corresponding dimming command signal to the feedback regulation loop 4, the PWM drive and overcurrent protection circuit 801, the PWM drive and overcurrent protection circuit 802, and the nth channel PWM drive and overcurrent protection circuit 80n according to the dimming signal and the determined output mode, respectively. The feedback regulation loop 4 compares and processes the dimming command signal with a sampled power supply output voltage signal, and outputs a signal to control the output of the transformer T1 which is regulated by the switching power supply main control circuit 2, thereby achieving the regulation of the output voltage of the rectifier filter circuit 3, which regulates the output voltage of the dimming power supply and constitutes a voltage regulation mode circuit. The dimming command signal output from the single-chip microcomputer control circuit 5 to the PWM drive and overcurrent protection circuit 801, the PWM drive and overcurrent protection circuit 802, and the nth channel PWM drive and overcurrent protection circuit 80n is a PWM signal, and the PWM drive and overcurrent protection circuit 801, the PWM drive and overcurrent protection circuit 802, and the nth channel PWM drive and overcurrent protection circuit 80n amplify the PWM signal and correspondingly control the MOSFET Q1, the MOSFET Q2, and the nth channel MOSFET Qn to change an output duty ratio of the dimming power supply, thereby constituting a PWM regulation mode circuit.

Figure 2:
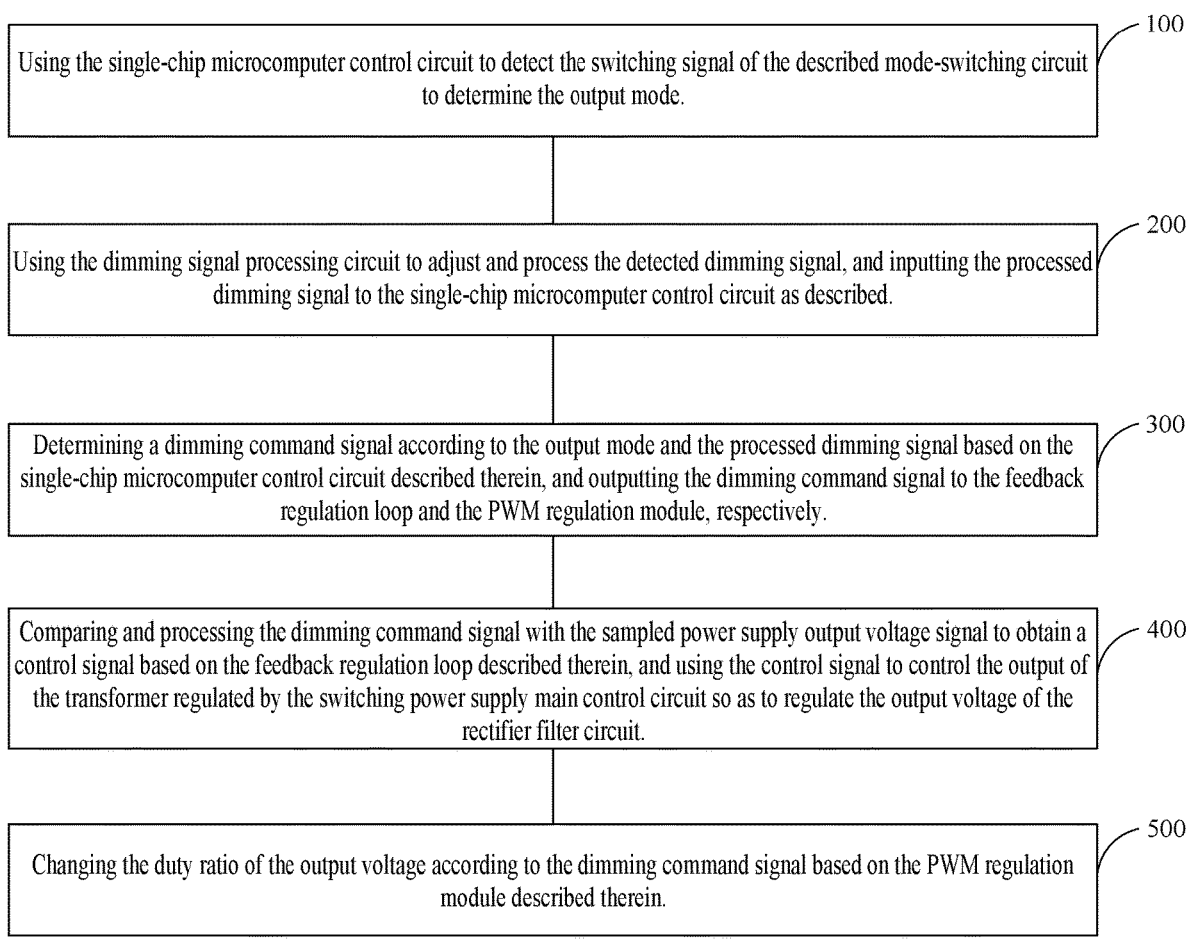
FIG. 2 is a flowchart of a method provided by an embodiment of the present invention.

FIG. 2 is a method flowchart provided by an embodiment of the present invention. As shown in FIG. 2, there is further disclosed in this embodiment a method of using the multi-output dimming power supply with switchable output modes, comprising: Step 100: Using the single-chip microcomputer control circuit to detect the switching signal of the described mode-switching circuit to determine the output mode;

Step 200: Using the dimming signal processing circuit to adjust and process the detected dimming signal, and inputting the processed dimming signal to the single-chip microcomputer control circuit as described;

Step 300: Determining a dimming command signal according to the output mode and the processed dimming signal based on the single-chip microcomputer control circuit described therein, and outputting the dimming command signal to the feedback regulation loop and the PWM regulation module, respectively;

Step 400: Comparing and processing the dimming command signal with the sampled power supply output voltage signal to obtain a control signal based on the feedback regulation loop described therein, and using the control signal to control the output of the transformer regulated by the switching power supply main control circuit so as to regulate the output voltage of the rectifier filter circuit; and Step 500: Changing the duty ratio of the output voltage according to the dimming command signal based on the PWM regulation module described therein.

Preferably, the method of detecting the switching signal of the mode-switching circuit by using the single-chip microcomputer control circuit for determining the output mode comprises:

Detecting the state of the mode set by the mode-switching circuit at each time of power-up in the single-chip microcomputer control circuit; and Performing the switching of the output mode according to the set mode state; and the output mode comprises a power supply output voltage regulation mode, a power supply output PWM regulation mode, a hybrid mode of power supply output voltage regulation and PWM regulation, and a power supply output color temperature or color regulation mode.

Specifically, the mode-switching circuit 7 can be set according to the user's needs, and the setting can be achieved by means of a DIP switch, an NFC programmer, a key programmer, and so on, the present invention does not impose any limitation on the setting method. The single-chip microcomputer control circuit 5 detects the set mode state of the mode-switching circuit 7 at each time of power-up and performs output mode switching according to the mode state set by the mode-switching circuit 7. The output mode comprises the power supply output voltage regulation mode, the power supply output PWM regulation mode, the hybrid mode of power supply output voltage regulation and PWM regulation, and the power supply output color temperature or color regulation mode.

The following is a description of how to control and use each of these modes:

1. Power supply output voltage regulation mode. When the single-chip microcomputer control circuit 5 is switched to the voltage regulation mode operation according to the signal provided by the mode-switching circuit 7, the single-chip microcomputer control circuit 5 sends 100% of dimming command signals to the PWM drive and overcurrent protection circuit 801, the PWM drive and overcurrent protection circuit 802, and the nth channel PWM drive and overcurrent protection circuit 80n, and correspondingly controls the MOSFET Q1, the MOSFET Q2, and the nth channel MOSFET Qn, all 100% conductive. At the same time, the single-chip microcomputer control circuit 5 sends the corresponding dimming command signal to the feedback regulation loop 4 according to the dimming signal processed by the dimming signal processing circuit 6, and the feedback regulation loop 4 compares and processes the dimming command signal with the power supply output voltage signal sampled by the feedback regulation loop 4 and outputs the signal for controlling the output of the transformer T1 regulated by the switching power supply main control circuit 2, thereby achieving the regulation of the output voltage of the rectifier filter circuit 3. It is not only to regulate the output voltage of the dimming power supply but also to change the luminance of the light by changing the output voltage of the power supply, thereby achieving the effect of dimming.

2. Power supply output PWM regulation mode. When the single-chip microcomputer control circuit 5 is switched to the PWM regulation mode operation according to the signal provided by the mode-switching circuit 7, the single-chip microcomputer control circuit 5 sends 100% of a dimming command signal to the feedback regulation loop 4. The feedback regulation loop 4 controls the switching power supply main control circuit 2 to enable the transformer T1 and the rectifier filter circuit 3 to output 100% of a rated voltage. At the same time, the single-chip microcomputer control circuit 5 sends the same dimming command signals to the PWM drive and overcurrent protection circuit 801, the PWM drive and overcurrent protection circuit 802, and the nth channel PWM drive and overcurrent protection circuit 80n, then the PWM drive and overcurrent protection circuit 801, the PWM drive and overcurrent protection circuit 802, and the nth channel PWM drive and overcurrent protection circuit 80n amplify the dimming command signal, and correspondingly control the MOSFET Q1, the MOSFET Q2, and the nth channel MOSFET Qn. It is not only to regulate the output duty ratio of the dimming power supply but also to change the luminance of the light by changing the output duty ratio of the dimming power supply, thereby achieving the effect of dimming.

3. Hybrid mode of the power supply output voltage regulation and PWM regulation. When the single-chip microcomputer control circuit 5 is switched to the hybrid mode operation of voltage regulation and PWM regulation according to the signal provided by the mode-switching circuit 7, the single-chip microcomputer control circuit 5 will send the dimming command signal to the feedback regulation loop 4 in a time period within the entire dimming range, and send the dimming command signals to the PWM drive and overcurrent protection circuit 801, the PWM drive and overcurrent protection circuit 802, and the nth channel PWM drive and overcurrent protection circuit 80n in another time period, thereby achieving a time-phased regulation of the output voltage and the output duty ratio, thereby achieving the effect of hybrid mode dimming. In some instances, the hybrid mode of the power supply output voltage regulation and PWM regulation is not necessary, and in that case, such mode will be removed. The embodiments that do not have the hybrid mode of the power supply output voltage regulation and PWM regulation should also be within the scope of protection of the present invention.

Power supply output color temperature or color regulation mode. When the single-chip microcomputer control circuit 5 is switched to the power supply output color temperature or color regulation mode according to the signal provided by the mode-switching circuit 7, the single-chip microcomputer control circuit 5 sends 100% of a dimming command signal to the feedback regulation loop 4. The feedback regulation loop 4 controls the switching power supply main control circuit 2 to enable the transformer T1 and the rectifier filter circuit 3 to output 100% of the rated voltage. At the same time, the single-chip microcomputer control circuit 5 sends the PWM dimming command signals with different duty ratios to the PWM drive and overcurrent protection circuit 801, the PWM drive and overcurrent protection circuit 802, and the nth channel PWM drive and overcurrent protection circuit 80n, respectively, then the PWM drive and overcurrent protection circuit 801, the PWM drive and overcurrent protection circuit 802, and the nth channel PWM drive and overcurrent protection circuit 80n amplify the dimming command signal and correspondingly control the MOSFET Q1, the MOSFET Q2, and the nth channel MOSFET Qn. It is not only to regulate the output duty ratio of each channel of the dimming power supply but also to achieve the regulation of color temperature and color, as well as to control the luminance when the output of the dimming power supply is connected to the different color temperature or different color of the lights in each channel.

In addition, the PWM drive and overcurrent protection circuit 801, the PWM drive and overcurrent protection circuit 802, and the nth channel PWM drive and overcurrent protection circuit 80n all have a current limiting function which is achieved by detecting a voltage drop generated by the current on the corresponding connected resistor R1, resistor R2, and the nth channel resistor Rn, respectively. When an overcurrent occurs, the PWM drive and overcurrent protection circuit 801, the PWM drive and overcurrent protection circuit 802, and the nth channel PWM drive and overcurrent protection circuit 80n will shut down the correspondingly connected MOSFET Q1, MOSFET Q2, and the nth channel MOSFET Qn in order to meet the requirements of the U.S. CLASS2 regulations by limiting the current, and at the same time, to play the function of overload and short-circuit protection.

The beneficial effects of the present invention are as follows:

The present invention enables switching between multiple output regulation modes, including voltage regulation, PWM regulation, and hybrid regulation, and switching with multiple output types. The adaptability of selecting different output modes for different applications facilitates the achievement of superior dimming effects.

In the present specification, each embodiment is described in a progressive manner, and each embodiment focuses on the differences with other embodiments, and the same and similar parts of each embodiment can be referred to each other.

In the present specification, a specific example is used to illustrate the principle and implementation of the present invention and the description of the above embodiments is used only to help understand the method of the present invention and its core idea; at the same time, for the person skilled in the art, according to the idea of the present invention, there may be changes in the specific implementation and scope of application. In conclusion, the contents of the present specification should not be construed as a limitation of the present invention.

What is claimed is:

1. A method of using a multi-output dimming power supply with switchable output modes, comprising:
   using a single-chip microcomputer control circuit to detect a switching signal of a mode-switching circuit to determine an output mode;
   using a dimming signal processing circuit to adjust and process a detected dimming signal, and inputting the processed dimming signal to the single-chip microcomputer control circuit;
   determining a dimming command signal according to the output mode and the processed dimming signal based on the single-chip microcomputer control circuit, and outputting the dimming command signal to a feedback regulation loop and one of at least two PWM regulation modules, respectively;
   comparing and processing the dimming command signal with a sampled power supply output voltage signal to obtain a control signal based on the feedback regulation loop, and using the control signal to control the output of a transformer regulated by a switching power supply main control circuit to regulate the output voltage of a rectifier filter circuit; and
   changing a duty ratio of the output voltage according to the dimming command signal based on the PWM regulation module; wherein
   the multi-output dimming power supply comprises the dimming signal processing circuit, the PWM regulation modules, an electromagnetic filter circuit, the switching power supply main control circuit, the transformer, the rectifier filter circuit, the feedback regulation loop, the single-chip microcomputer control circuit, and the mode-switching circuit connected in sequence,
   the feedback regulation loop is connected to the switching power supply main control circuit, and a signal input of each PWM regulation module is connected to each control terminal of the single-chip microcomputer control circuit, and a positive pole of each PWM regulation module is connected to the output of the rectifier filter circuit and a load, respectively, and a negative pole of each PWM regulation module is connected to the load;
   each PWM regulation module comprises a PWM drive and overcurrent protection circuit, a MOSFET, a connection channel, and a resistor; and
   a signal input of the PWM drive and overcurrent protection circuit is connected to the control terminal of the single-chip microcomputer control circuit, and a first output of the PWM drive and overcurrent protection circuit is connected to a gate of the MOSFET; and
   a negative pole of the connection channel is connected to a drain of the MOSFET and the load, and a source of the MOSFET is connected to a second output of the PWM drive and overcurrent protection circuit and the resistor, which is further connected to a ground; and
   a positive pole of the connection channel is connected to the rectifier filter circuit, the feedback regulation loop, and the load, respectively.

2. The method according to claim 1, wherein the method of detecting the switching signal of the mode-switching circuit by using the single-chip microcomputer control circuit for determining the output mode, comprising:

detecting the state of the mode set by the mode-switching circuit at each time of power-up in the single-chip microcomputer control circuit; and performing the switching of the output mode according to the mode state; wherein the output mode comprises a power supply output voltage regulation mode, a power supply output PWM regulation mode, a hybrid mode of power supply output voltage regulation and PWM regulation, and a power supply output color temperature or color regulation mode.

3. The method according to claim 2, wherein when the single-chip microcomputer control circuit is switched to the power supply output voltage regulation mode according to the signal provided by the mode-switching circuit, using the single-chip microcomputer control circuit to send 100% of a dimming command signal to the PWM regulation modules and correspondingly control 100% conduction of each of the PWM regulation modules;

sending the corresponding dimming command signal to the feedback regulation loop according to the dimming signal processed by the dimming signal processing circuit based on the single-chip microcomputer control circuit; and using the feedback regulation loop to compare and process the dimming command signal with a power supply output voltage signal sampled by the feedback regulation loop, and to output a signal for controlling the output of the transformer T1 regulated by the switching power supply main control circuit so as to regulate the output voltage of the rectifier filter circuit.

4. The method according to claim 2, wherein when the single-chip microcomputer control circuit is switched to the power supply output PWM regulation mode according to the signal provided by the mode-switching circuit, using the single-chip microcomputer control circuit to send 100% of a dimming command signal to the feedback regulation loop;

using the feedback regulation loop to control the switching power supply main control circuit to enable the transformer and the rectifier filter circuit to output 100% of a rated voltage;

using the single-chip microcomputer control circuit to send the same dimming command signal to each of the PWM regulation modules according to the dimming signal processed by the dimming signal processing circuit; and using the PWM regulation module to amplify the dimming command signal, and to regulate the output duty ratio of the output voltage according to the corresponding dimming command signal.

5. The method according to claim 2, wherein when the single-chip microcomputer control circuit is switched to the hybrid mode of voltage regulation and PWM regulation of the power supply output according to the signal provided by the mode-switching circuit, using the single-chip microcomputer control circuit to send a dimming command signal to the feedback regulation loop in a time period within the entire dimming range and to send the dimming command signal to the respective PWM regulation module in another time period in order to achieve a time-phased regulation of the output voltage and output duty ratio.

6. The method according to claim 2, wherein when the single-chip microcomputer control circuit is switched to the power supply output of the color temperature or color regulation mode according to the signal provided by the mode-switching circuit, using the single-chip microcomputer control circuit to send 100% of a dimming command signal to the feedback regulation loop;

using the feedback regulation loop to control the switching power supply main control circuit to enable the transformer and the rectifier filter circuit to output 100% of the rated voltage;

sending the PWM dimming command signals with different duty ratios to each of the PWM regulation modules, respectively, according to the dimming signals processed by the dimming signal processing circuit based on the single-chip microcomputer control circuit; and using the PWM regulation module to amplify the dimming command signals and regulate the output duty ratios of the output voltage according to the amplified dimming command signals, respectively, to regulate the color temperature, color, and luminance of the lights with different color temperatures or different colors that are correspondingly connected to each output voltage.

7. The method according to claim 2, further comprising:

detecting a voltage drop generated by the resistor in each PWM regulation module to achieve current limiting; and using the PWM drive and overcurrent protection circuit in the PWM regulation module to shut down the corresponding connected MOSFET when an overcurrent occurs to achieve current limiting and short-circuit protection.

\* \* \* \* \*